United States Patent [19]
Cassonnet

[11] 4,040,031
[45] Aug. 2, 1977

[54] COMPUTER INSTRUCTION CONTROL APPARATUS AND METHOD

[75] Inventor: Jean-Claude Marcel Cassonnet, Conflans-Ste-Hororine, France

[73] Assignee: Compagnie Honeywell Bull (Societe Anonyme), Paris, France

[21] Appl. No.: 540,820

[22] Filed: Jan. 14, 1975

Related U.S. Application Data

[63] Continuation-in-part of Ser. No. 460,467, April 12, 1974.

[30] Foreign Application Priority Data

Apr. 13, 1973 France ................. 73.13502

[51] Int. Cl.² ........................................... G06F 9/00
[52] U.S. Cl. ............................................. 364/200
[58] Field of Search ............................ 340/172.5

[56] References Cited

U.S. PATENT DOCUMENTS

| | | | |
|---|---|---|---|
| 3,553,655 | 1/1971 | Anderson et al. | 340/172.5 |
| 3,559,183 | 1/1971 | Sussenguth | 340/172.5 |
| 3,577,190 | 5/1971 | Cocke et al. | 340/172.5 |
| 3,644,900 | 2/1972 | Mizoguchi | 340/172.5 |
| 3,736,567 | 5/1973 | Lotan et al. | 340/172.5 |
| 3,766,527 | 10/1973 | Briley | 340/172.5 |

FOREIGN PATENT DOCUMENTS

| | | |
|---|---|---|
| 7,313,502 | 4/1973 | France |
| 2,226,079 | 11/1974 | France |

*Primary Examiner*—Gareth D. Shaw
*Assistant Examiner*—C. T. Bartz
*Attorney, Agent, or Firm*—Lowe, King, Price & Markva

[57] ABSTRACT

The disclosure describes a data processing system including a program memory for storing a first instruction at a first address and a second instruction at a second address. The system includes a look-ahead feature in which the second instruction is stored in a buffer register while the first instruction is being stored in an execution register and is simultaneously being executed. A gate circuit controls the transmission of data between the buffer register and the execution register. If a third instruction having a third address is read into the program memory while the first instruction is being executed, the second and third addresses are compared. If the second and third addresses are identical, the gate circuit is inhibited and the second instruction is prevented from being transmitted to the execution register. Instead, the third instruction or a portion thereof, is transmitted to the buffer and execution registers, so that the third instruction is executed in place of the second instruction.

5 Claims, 3 Drawing Figures

COMPUTER INSTRUCTION CONTROL APPARATUS AND METHOD

RELATED APPLICATION

The applicant claims priority under 35 U.S.C. 119 based on French Pat. application No. 73,13502, entitled "Dispositif de Prise en Compte des et al", filed Apr. 13, 1973. This is a continuation-in-part of U.S. application Ser. No. 460,467, entitled "Computer Instruction Control Apparatus And Method", filed Apr. 12, 1974, in the name of the present applicant.

BACKGROUND AND SUMMARY OF THE INVENTION

The present invention relates to data processing and more particularly relates to a method and apparatus for controlling the transmission of data between registers in a look-ahead program execution system.

In a data-processing system, the instructions constituting a program are recorded in one or more stores or memories and are carried out sequentially by the system. While the program is being carried out, alterations can be made, either deliberately or inadvertently, to the content of certain instructions contained in the program.

In most data processing systems, instructions follow each other in sequential order. For example, an instruction $a$ stored at an address A might be programmed for execution immediately prior to an instruction $b$ stored at an address B. Instruction $a$ is normally read into an execution register while it is being executed or carried out. In order to save time during processing, some systems have a look-ahead feature in which instruction $b$ is stored in a special buffer memory or register while instruction $a$ is being executed. Once instruction $a$ has been carried out, instruction $b$ is at once available for execution or appropriate processing.

In practice, the buffer register is of limited capacity and it is not an instruction which is stored (since the instructions vary in length), but a certain number of data bits.

When instruction $b$ at address B is altered for any reason, and is replaced by an instruction $b'$ while instruction $a$ is being carried out, the buffer register will transmit instruction $b$ to the execution register, rather than instruction $b'$. Of course, this procedure will give the wrong result.

It is an object of the present invention to prevent instruction $b$ stored in the buffer register from being carried out if a modification is made in instruction $b$ while instruction $a$ is being carried out.

One feature of the present invention provides a method for taking into account dynamic alterations made to a program in a data-processing system provided with a look-ahead buffer store or register, wherein the progress of the program is arrested and returned to a chosen point when a new instruction replaces the instruction stored in the buffer register.

According to another feature, the program is arrested when the address of the new instruction read into the program memory and the address of the instruction contained in the buffer store are the same. A comparison operation prevents the instruction stored in the buffer register from being transferred to the execution register which would carry it out.

Another feature of the present invention provides an apparatus which employs the above method and which contains a buffer register into which is read the instruction following the instruction being carried out and stored in an execution register. A logic gate connected between the buffer register and the execution register is responsive to an inhibit signal generated by a logic means to prevent the transmission of data between the buffer and execution registers. The logic means produces the inhibit signal in response to a read-in signal which indicates that the new instruction is being read into the program memory and an output signal from a comparator which compares the address of the new instruction with the address of the instruction contained in the buffer register.

In accordance with another feature of the invention, the combined generation of the inhibit signal and a signal to indicate that the instruction stored in the execution register has been carried out causes the new instruction to be read out of the program memory into the buffer register.

The way in which the program is carried out is thus unaffected by the fact that the instructions of which it is made up are read out in advance, since transfer of the contents of the buffer register to the execution register is inhibited if an instruction is modified. Furthermore, as was mentioned above, the buffer register may record a certain number of instruction bits which may form a partial instruction or a number of instructions. The method according to the invention may be applied automatically in all cases, whereas practically nothing can be done to improve the situation from the software point of view, bearing in mind that the instructions are of different lengths whereas the buffer register can only contain a constant number of bits.

DESCRIPTION OF THE DRAWINGS

These and other objects, advantages and features of the invention will now be further described, by way of example, with reference to the accompanying drawings, in which.

DESCRIPTION OF THE PREFERRED EMBODIMENT

Figure 1:
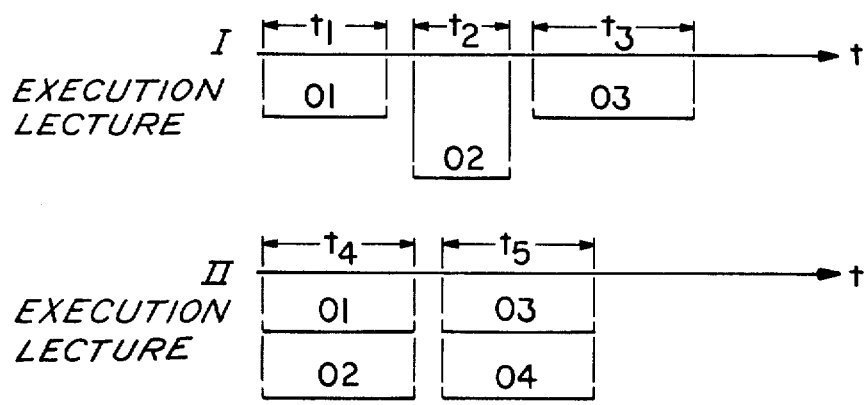
FIG. 1 is a diagram showing the principle of the operation known as look-ahead programming, or reading in advance.

In FIG. 1, reference numeral I refers to the normal progress of a stored program, with the variable being time $t$. The evolution of the program is as follows:

01 is an instruction $a$ being carried out during time period t1.

02 is an instruction $b$ being read out during time period t2.

03 is an instruction $b$ being carried out during time period t3.

At II is shown the way in which the operations take place in the case of a look-ahead program, with time still being the variable. 01 is instruction a being carried out, and 02 is instruction b being read out during the same time period 04.

Instruction b is carried out at 03 while instruction $c$ is read out at 04, both during time period t5. The object of this process is to save time.

Figure 2:
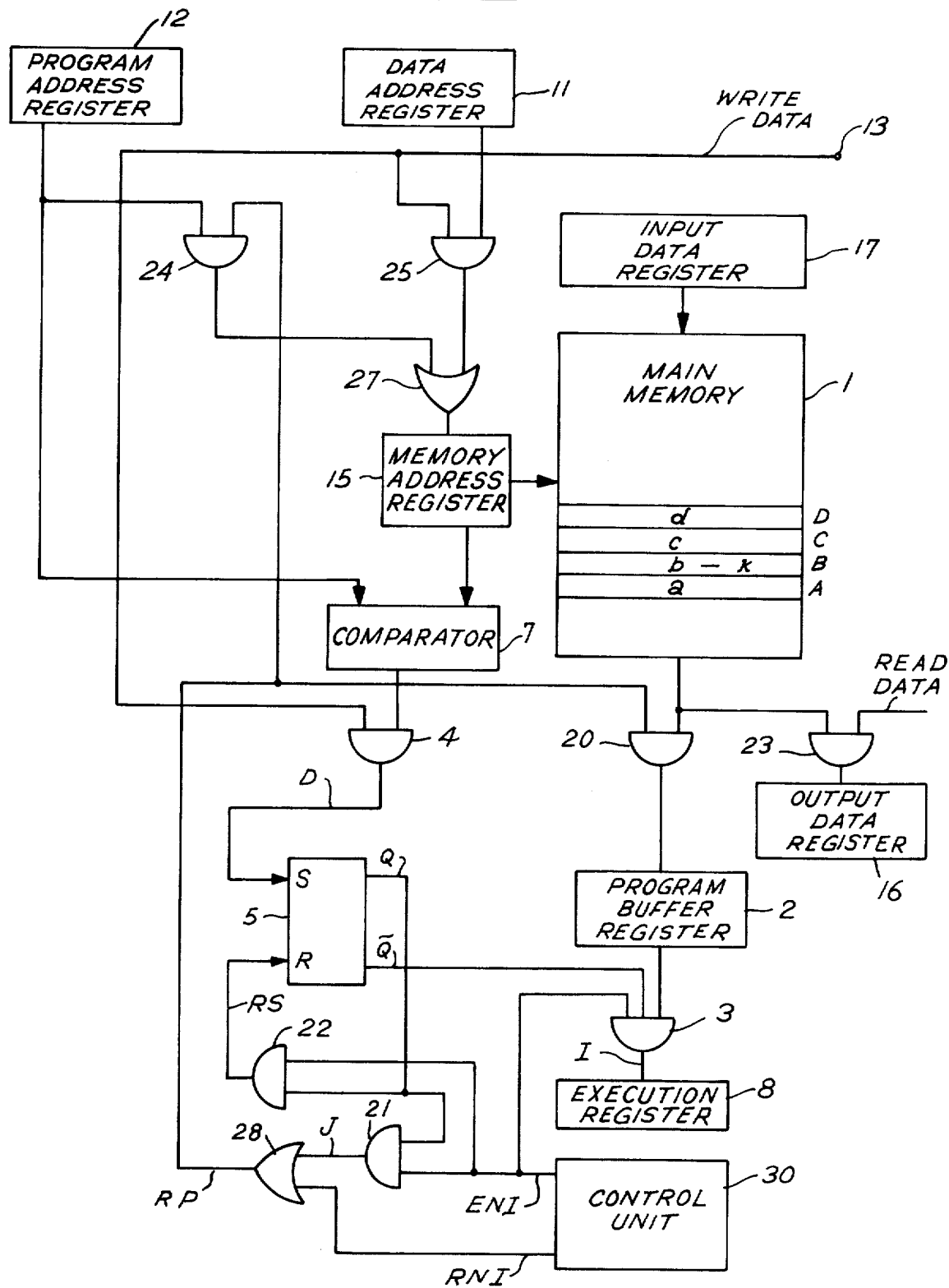
FIG. 2 is a logic, block diagram describing a preferred embodiment of apparatus made according to the invention.

In FIG. 2 is shown an apparatus which enables the program to be read out in advance while preventing errors which may arise when an instruction in the program being processed is altered dynamically.

In store or program memory 1 are recorded a certain number of programs, and in particular an instruction a at address A, and instruction b at address B, an instruction c at address C and an instruction d at address D. When instruction a is being carried out and stored in an execution register 8 during time period t4, instruction b is being fed into a store or program buffer register 2 and the address B of instruction b is being fed into a program address register 12.

The instructions are sequentially transmitted to a program buffer register 2 and through an AND gate 3 to an execution register 8. While an instruction is being stored in register 8 and executed, the next sequential instruction stored in main memory 1 is read into buffer register 2. For example, when instruction a is being stored in register 8 during time period t4, instruction b is being read into buffer register 2.

If a fresh instruction k is written into memory 1 at address B while instruction b is stored in buffer register 2, normal operation of the circuitry in interrupted so that instruction k can be read into buffer register 2 in place of instruction b. This mode of operation is achieved in part by an AND gate 4, flip-flip 5 and a comparator circuit 7.

The system includes a number of registers. The address of an instruction to be writen into memory 1 is held in a data address register 11, and the order in which instructions are read out of main memory 1 is controlled by the sequential order in which addresses are temporarily stored in a program address register 12. A write data signal generated on conductor 13 enables new instructions to be read into main memory 1. Additional registers required to operate this system include:

a memory address register 15 which stores the address of the instruction being read out of or written into main memory 1;

an output data register 16 which stores an instruction read out of main memory 1 while a "read data" signal is switched to a logical 1 state; and an input data register 17 which stores an instruction being read into main memory 1.

The system also includes AND gates 20-25 and OR gates 27, 28. A control unit 30 of conventional design produces an Enter Next Instruction (ENI) pulse and a Read Next Instruction (RNI) pulse in order to transmit in proper sequence the instructions stored in main memory 1 into program buffer register 2 and execution register 8.

Figure 3:
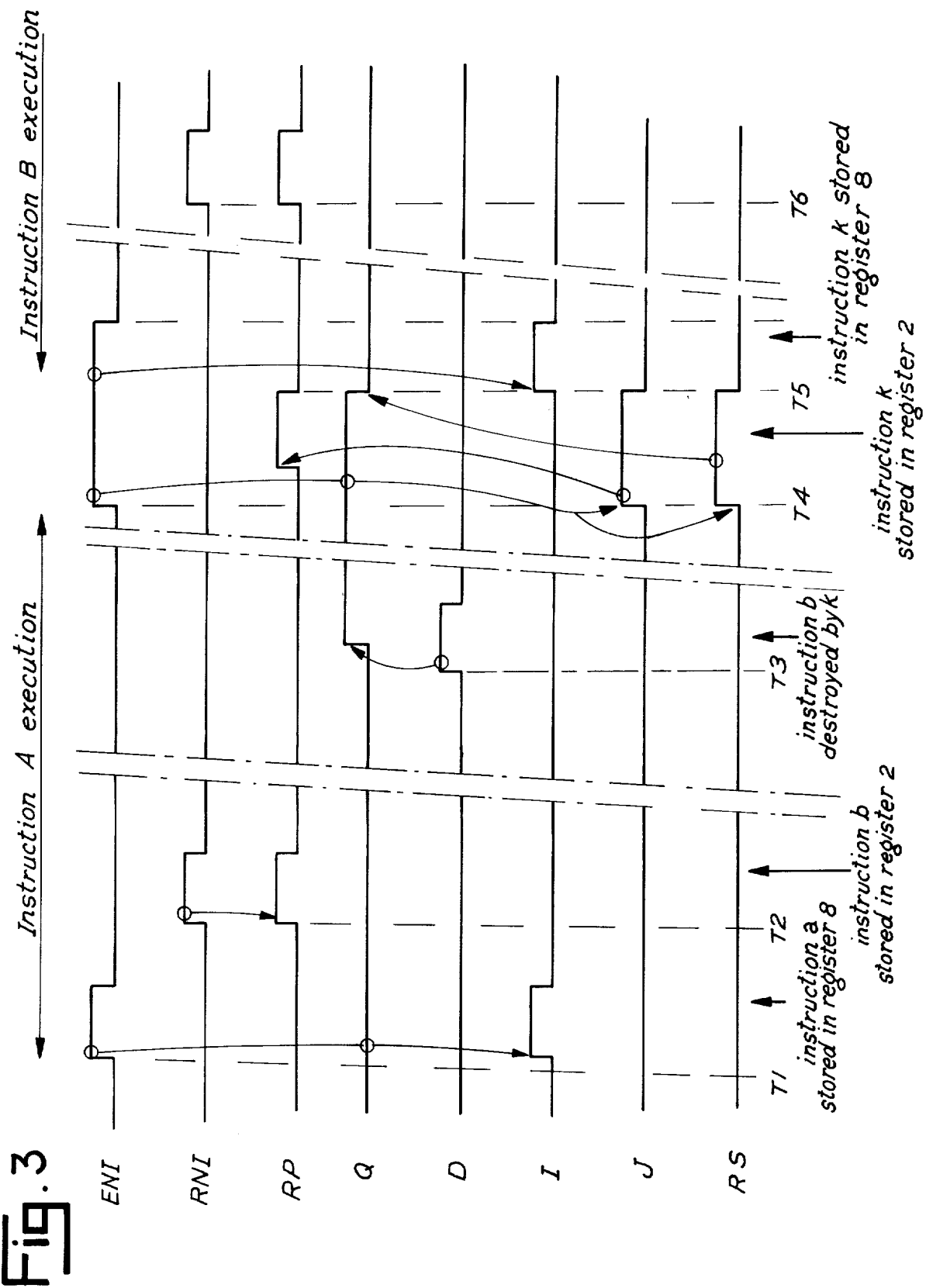
FIG. 3 is a timing diagram illustrating the voltage waveforms produced at the like-lettered portions of FIG. 2.

Assuming instruction a is stored in buffer register 2 and instructions b-d are stored in memory 1 at addresses B-D respectively, the instructions are executed as follows if no new or different instructions are read into addresses B-D:

Referring to FIG. 3, at time T1, flipflop 5 is in its normal or reset state in which its Q output is switched to a logical 0 state and its $\overline{Q}$ output is switched to a logical 1 state in order to enable AND gate 3. In response to the generation of an ENI pulse at time T1 by control unit 30, AND gate 3 transmits instruction a from buffer register 2 to execution register 8.

At time T2, while instruction a is still being executed, control unit 30 generates an RNI pulse which switches the output of OR gate 28 to a logical 1 state (i.e., generates an RP pulse). As a result, address B is transmitted through AND gate 24 and OR gate 27 to address register 15. Instruction b is then read out of main memory 1 through AND gate 20 into program buffer register 2.

As soon as the execution of instruction a is completed, a signal is provided to control unit 30 which causes another ENI pulse to be generated. Instruction b then is transferred from buffer register 2 through AND gate 3 into execution register 8. While instruction b is being executed, address C is stored in program address register 12 and control unit 30 generates another RNI pulse which transmits address C into address register 15. As a result, instruction c is read out of memory 1 and is stored in buffer register 2. This sequence of ENI and RNI signals is continued until all of the instructions stored in main memory have been executed.

Assuming flipflop 5 is in the same initial condition described above, and assuming that a new instruction k is substituted for instruction b while instruction a is being stored in register 8 and executed, the system operates as follows:

Referring to FIG. 3, the ENI pulse is produced by control unit 30 at time T1, and the RNI pulse is produced at time T2 so that instruction b is stored in buffer register 2 while instruction a is being stored in register 8 and executed. At time T3, while instruction a is being executed, address B is read into data address register 11 and instructions k is read into input data register 17 so that instruction k will be substituted for instruction b. At the same time, conductor 13 is switched to a logical 1 state to provide a "write data" signal. As a result, address B is transmitted through AND gate 25 and OR gate 27 into address register 15, and instruction k is read into address B of main memory 1.

The addresses stored in address registers 11 and 12 then are transmitted to comparator 7. Since registers 11 and 12 both contain address B at this time, comparator 7 indicates a true comparison by producing a logical 1 signal on its output terminal. The output of AND gate 4 is then switched to its logical 1 state so that flipflop 5 is switched to its set condition in which the Q output is switched to a logical 1 state and the $\overline{Q}$ output is switched to a logical 0 state. As a result, instruction b stored in buffer register 2 is prevented from passing through AND gate 3.

As soon as the execution of instruction a is completed, control unit 30 produces another ENI pulse which switches the J output of AND gate 21 and the RP output of OR gate 28 to their logical 1 states. In response to the RP pulse produced at time T4, instruction k is transmitted from main memory 1 through AND gate 20 to buffer register 2. At time T4, AND gate 22 produces an RS pulse which resets flipflop 5. The Q output returns to a logical 0 state and the $\overline{Q}$ output returns to a logical 1 state which enables AND gate 3. Since the ENI pulse is still being generated by control unit 30 at time T5, instruction k is transmitted from buffer register 2 through AND gate 3 into execution register 8. Later, at time T6, while instruction k is being executed, control unit 30 produces another RNI pulse which, in turn, generates an RP pulse. Instruction c then is read out of main memory 1 and stored in buffer register 2 through AND gate 20.

Referring to FIG. 3, it should be noted that the ENI pulse generated at time T1 is shorter in duration than the ENI pulse generated at time T4. This mode of operation can be achieved in a variety of well-known ways. For example, control unit 30 can be given access to the Q output of flip-flop 5 so that the production of the ENI pulse of normal duration is delayed until the Q output of flipflop 5 returns from a logical 1 state to a logical 0 state. Alternatively, control unit 30 can be given access to the D output of AND gate 4 so that the next ENI pulse following the production of a logical 1 signal by AND gate 4 has increased duration.

In the foregoing example, the circuitry carried out instruction $k$, rather than instruction $b$, which was stored in buffer register 2. However, those skilled in the art will recognize that instruction $k$ could have been substituted for any of instructions $a-d$ stored in memory 1. After instruction $k$ is executed, the program continues to be executed in the manner originally described in connection with FIG. 3. That is, the contents of register 2 are transferred to register 8 and the instruction in register 8 is executed while the next sequential instruction is being read out of memory 1 into register 2. The process continues in this manner until there is a fresh alteration in the instructions stored in main memory 1.

Those skilled in the art will recognize that the single embodiment described herein can be altered and modified without departing from the true spirit and scope of the invention as defined in the accompanying claims.

What is claimed is:

1. In a data processing system including an addressable memory for memorizing program instructions or data, a memory address register connected to said addressable memory for storing the address of an instruction program or data to be read from or written into the addressable memory, a buffer register connected to said addressable memory for storing at least a portion of the instruction or for storing the data read at one address of the addressable memory, an execution register for storing the contents of said buffer register, the improvement comprising means connected between an output of the buffer register and an input of the execution register for loading the contents of the buffer register into the execution register in response to an address of the instruction which has been read into the buffer register differing from the address of a next instruction which is to be written into the addressable memory and for preventing the contents of the buffer register from being loaded into the execution register in response to the address of the instruction which has been read into the buffer register being the same as the address of the next instruction which is to be written into the addressable memory.

2. The apparatus of claim 1 wherein the means for loading and preventing includes comparator means for inhibiting the loading of the contents of the buffer register into the execution register in response to the address of the instruction which has been loaded into the buffer register being the same as the address of the next instruction which is to be written into the addressable memory.

3. The apparatus of claim 2 wherein the comparator means has a first input connected to be responsive to an output of a memory address register containing the memory address of the instruction which is to be written into the addressable memory, said comparator means having a second input connected to be responsive to the output of an address buffer containing the memory address of the instruction which was loaded into the buffer register.

4. The apparatus of claim 3 wherein the means for loading and preventing includes a gate connected between the buffer register output and the execution register input for selectively feeding the contents of the buffer register to the execution register, and a flip-flop circuit having an input connected to the comparator and an output connected to the gate to inhibit the gate in response to the contents of the memory address register being the same as the contents of the address buffer.

5. The apparatus of claim 2 wherein the means for loading and preventing includes a gate connected between the buffer register output and the execution register input for selectively feeding the contents of the buffer register to the execution register, and a flip-flop circuit having an input connected to the comparator and an output connected to the gate to inhibit the gate in response to the contents of the memory address register being the same as the contents of the address buffer.

* * * * *